United States Patent
Li et al.

(10) Patent No.: US 10,254,131 B2
(45) Date of Patent: Apr. 9, 2019

(54) DETECTION DEVICE, SUBSTRATE HOLDER AND METHOD FOR DETECTING POSITION OF SUBSTRATE ON SUBSTRATE HOLDER

(71) Applicants: BOE Technology Group Co., Ltd., Beijing (CN); Hefei Boe Optoelectronics Technology Co., Ltd., Anhui (CN)

(72) Inventors: Guodong Li, Beijing (CN); Zhen Wei, Beijing (CN); Shibo Guo, Beijing (CN); Weiwei Sun, Beijing (CN); Chenchen Jiang, Beijing (CN); Qiong Zhao, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 7 days.

(21) Appl. No.: 15/512,890

(22) PCT Filed: Sep. 22, 2016

(86) PCT No.: PCT/CN2016/099657
§ 371 (c)(1),
(2) Date: Mar. 21, 2017

(87) PCT Pub. No.: WO2017/067365
PCT Pub. Date: Apr. 27, 2017

(65) Prior Publication Data
US 2017/0299407 A1    Oct. 19, 2017

(30) Foreign Application Priority Data
Oct. 23, 2015 (CN) .......................... 2015 1 0698697

(51) Int. Cl.
*G01D 5/20* (2006.01)
*G01D 5/241* (2006.01)

(52) U.S. Cl.
CPC .............. *G01D 5/20* (2013.01); *G01D 5/2412* (2013.01)

(58) Field of Classification Search
CPC ............................... G01D 5/24; G01D 5/2405
See application file for complete search history.

(56) References Cited

U.S. PATENT DOCUMENTS 5,423,206 A * 6/1995 Hetzel ................. G01N 33/497
                                                    73/304 C
5,861,754 A    1/1999 Ueno et al.
(Continued)

FOREIGN PATENT DOCUMENTS

| CN | 101630081 | 1/2010 |
| CN | 102253505 | 11/2011 |

(Continued)

OTHER PUBLICATIONS

First Office Action for Chinese Patent Application No. 201510698697.9 dated May 15, 2017.
(Continued)

*Primary Examiner* — Walter L Lindsay, Jr.
*Assistant Examiner* — Milton Gonzalez
(74) *Attorney, Agent, or Firm* — Calfee, Halter & Griswold LLP

(57) ABSTRACT

A detection device, a substrate holder and a method for detecting a position of a substrate on a substrate holder are disclosed. The detection device of the present disclosure is used to detect the position of the substrate carried on the substrate holder, and the substrate holder includes a plurality of carrying positions, each of which is used to carry a substrate. The detection device includes an emitting elec-
(Continued)

trode connected to a signal source, which is disposed at an edge of each carrying position and located at one of upper and lower sides of the substrate carried by the carrying position; and at least one receiving electrode connected to a detector, which is disposed opposite to the emitting electrode and located at the other of the upper and lower sides of the substrate carried by the carrying position.

17 Claims, 4 Drawing Sheets

(56) References Cited

U.S. PATENT DOCUMENTS

| | | | |
|---|---|---|---|
| 6,390,754 B2* | 5/2002 | Yamaga | H01L 21/67259 414/217 |
| 6,724,195 B2* | 4/2004 | Lurtz | G01K 7/223 200/85 R |
| 6,745,901 B2* | 6/2004 | Chen | H01L 21/67265 206/454 |
| 8,477,105 B2 | 7/2013 | Haga et al. | |
| 8,659,573 B2 | 2/2014 | Haga et al. | |
| 8,803,838 B2 | 8/2014 | Haga et al. | |
| 2006/0176189 A1* | 8/2006 | Bar-On | G01D 5/2405 340/870.37 |
| 2010/0013791 A1 | 1/2010 | Haga et al. | |
| 2010/0120333 A1* | 5/2010 | Sin | B24B 37/013 451/5 |
| 2011/0193573 A1* | 8/2011 | De Boer | G01B 7/023 324/686 |
| 2013/0285986 A1 | 10/2013 | Haga et al. | |
| 2014/0125616 A1 | 5/2014 | Haga et al. | |
| 2014/0347075 A1 | 11/2014 | Goto et al. | |

FOREIGN PATENT DOCUMENTS

| | | |
|---|---|---|
| CN | 102468154 | 5/2012 |
| CN | 103998275 | 8/2014 |
| CN | 105185283 | 12/2015 |
| EP | 821216 | 1/1998 |
| EP | 821216 | 9/2003 |
| EP | 2792528 | 10/2014 |

OTHER PUBLICATIONS

International Search Report and Written Opinion from PCT/CN16/99657 dated Dec. 27, 2016.

* cited by examiner

DETECTION DEVICE, SUBSTRATE HOLDER AND METHOD FOR DETECTING POSITION OF SUBSTRATE ON SUBSTRATE HOLDER

CROSS-REFERENCE TO RELATED APPLICATIONS

The present application is based on International Application No. PCT/CN2016/099657, filed on Sep. 22, 2016, which is based upon and claims priority to Chinese Patent Application No. 201510698697.9, filed Oct. 23, 2015, the entire contents of which are incorporated herein by reference.

TECHNICAL FIELD

The present disclosure relates to the field of substrate storage technology, and more particularly to a detection device, a substrate holder, and a method of detecting a position of a substrate on a substrate holder.

BACKGROUND

The preparation procedure of an array substrate, a color film substrate and the like of a display device such as a liquid crystal display device or an organic light emitting diode display device includes a plurality of different processes. During the processes, in order to store and transport the substrate, it is necessary to place the substrate (which can be in the cassette) on a substrate holder. The substrate holder is a holder having a plurality of layers, each of which has a position for carrying a substrate, and the substrate can be accessed by a robot.

Due to the accumulation of operating errors of the robot, there is a position deviation when the substrate is placed on the substrate holder, and the position deviation may increase with time. When the position deviation of the substrate is increased to a certain extent, the position deviation of the substrate on a base platform of an equipment for processing may be too large, resulting in difficulty in alignment or failure to complete alignment. Or, it may also cause the substrate to touch other structures during transporting, resulting in damage to the substrate.

The relevant substrate holder cannot detect the position of the substrate thereon. In order to avoid excessive deviation of the above substrate position, the relevant method is to measure the position of the substrate on each substrate holder (for example, to measure three substrate holders) periodically (e.g., every quarter) by an artificial sampling measurement, and adjust the robot according to the detection result. Obviously, this method of artificial sampling has problems such as inefficiency, large error, high error rate, not timely and so on.

It should be noted that, information disclosed in the above background portion is provided only for better understanding of the background of the present disclosure, and thus it may contain information that does not form the prior art known by those ordinary skilled in the art.

SUMMARY

The present disclosure provides a detection device, a substrate holder, and a method of detecting a position of a substrate on a substrate holder.

An embodiment of the present disclosure is a detection device for detecting position of substrate carried on the substrate holder. The substrate holder includes a plurality of carrying positions, each of which is used to carry a substrate. The detection device includes: an emitting electrode connected to a signal source, which is disposed at an edge of each carrying position and located at one of upper and lower sides of the substrate carried by the carrying position; and at least one receiving electrode connected to a detector, which is disposed opposite to the emitting electrode and located at the other of the upper and lower sides of the substrate carried by the carrying position.

Another embodiment of the present disclosure is a substrate holder, and the substrate holder includes: a plurality of carrying positions, each of which is used to carry a substrate; and the detection device described as above.

Yet another embodiment of the present disclosure is a method for detecting a position of a substrate carried on the substrate holder described as above, and the method includes: transmitting a signal by a emitting electrode of the detection device; receiving the signal and generating an induction signal by a receiving electrode; and determining the position of the substrate by analyzing the induction signal.

BRIEF DESCRIPTION OF THE DRAWINGS

In order to more clearly illustrate the technical solution of the embodiments of the present disclosure, the drawings referred to in the description of the embodiments of the present disclosure will be briefly described below. It will be apparent that the drawings in the following description are merely examples of the present disclosure. It will be apparent to those skilled in the art that other drawings may be obtained without creative labor.

REFERENCE NUMERALS

1: substrate holder; 11: carrying position; 2: detection device; 21: emitting electrode; 211: signal source; 22: receiving electrode; 221: detector; 9: substrate; 91: auxiliary dielectric layer.

DETAILED DESCRIPTION

The present disclosure will now be described in further detail with reference to the accompanying drawings and specific embodiments, in order that those skilled in the art will have a better understanding of the technical solutions of the present disclosure.

Figure 1:
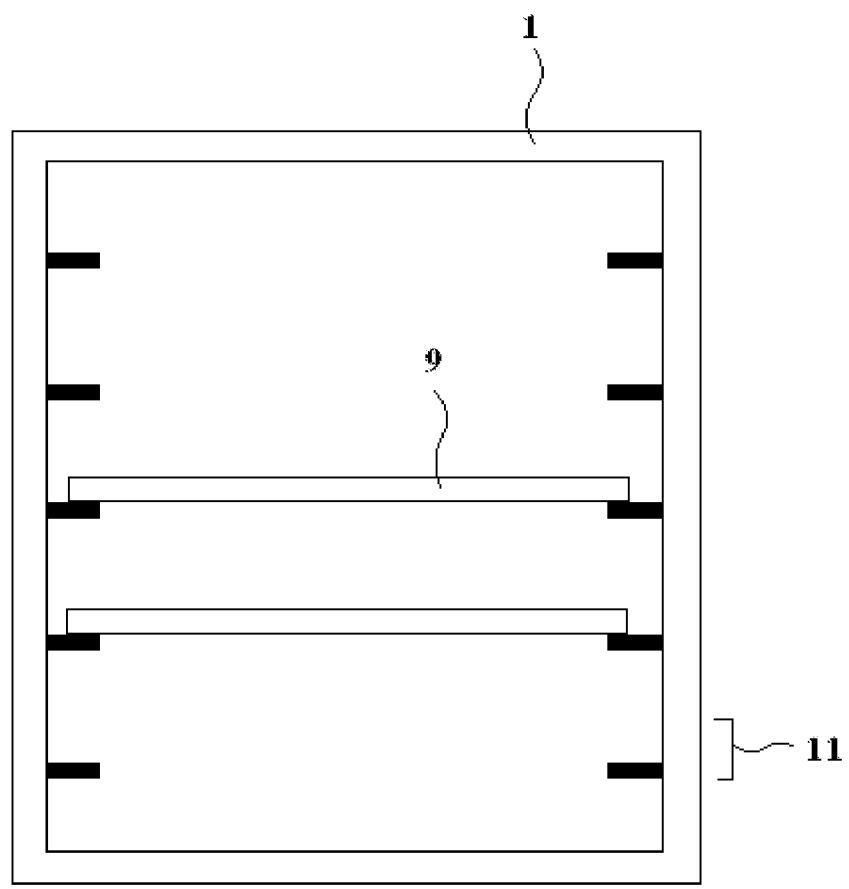
FIG. 1 is a schematic side view of a structure of the relevant substrate holder.

FIG. 1 is a schematic side view of a structure of the relevant substrate holder. The relevant substrate holder has a structure of a plurality of layers, and each layer has a carrying position for carrying a substrate. The substrate can be accessed by a robot.

Due to the accumulation of operating errors of the robot, there is a position deviation when the substrate is placed on the substrate holder, and the position deviation may increase with time. When the position deviation of the substrate is increased to a certain extent, the position deviation of the substrate on a base platform of an equipment for processing may be too large, resulting in difficulty in alignment or failure to complete alignment. Or, it may also cause the substrate to touch other structures during transporting, resulting in damage to the substrate.

As shown in FIGS. 2 to 7, an embodiment of the present disclosure provides a detection device 2, which is used to detect a position of a substrate 9 carried on a substrate holder 1. The substrate holder 1 includes a plurality of carrying positions 11, and each of the carrying positions 11 is used to carry a substrate 9.

In particular, the detection device 2 includes: an emitting electrode (i.e. emitter) 21 connected to a signal source 211, which is disposed at an edge of the carrying position 11 and located at one of upper and lower sides of the substrate 9 carried by the carrying position 11; and at least one receiving electrode (i.e. receiver) 22 connected to a detector 221, which is disposed opposite to the emitting electrode 21 and located at the other of the upper and lower sides of the substrate 9 carried by the carrying position 11.

Figure 2:
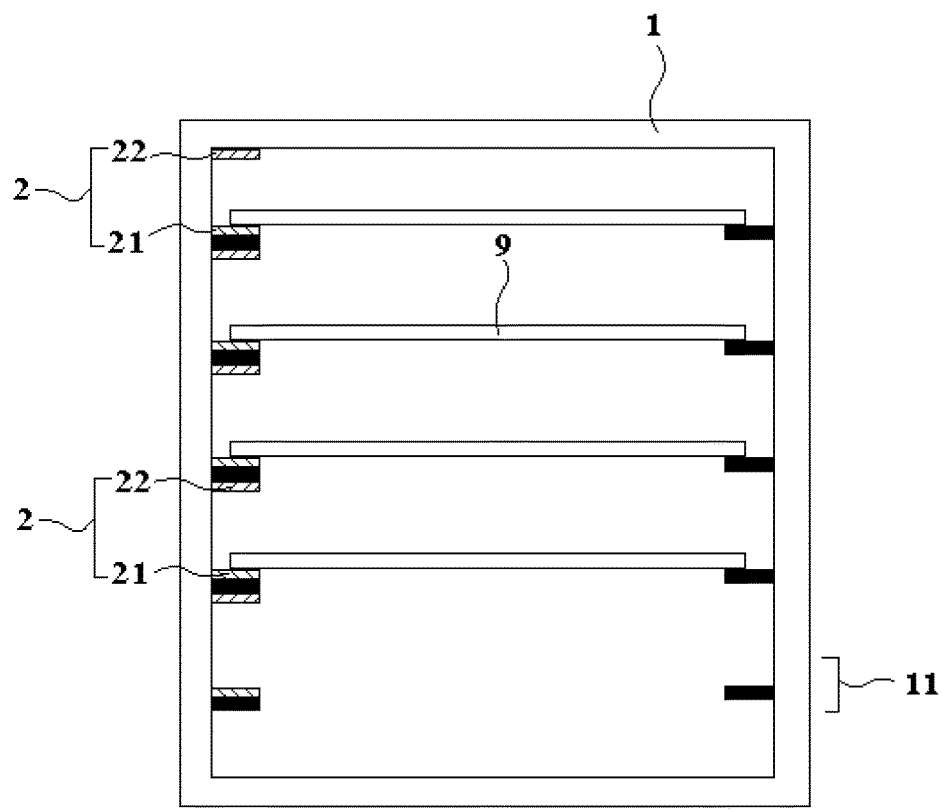
FIG. 2 is a schematic side view of a structure of a substrate holder of some embodiments of the present disclosure.
Figure 3:
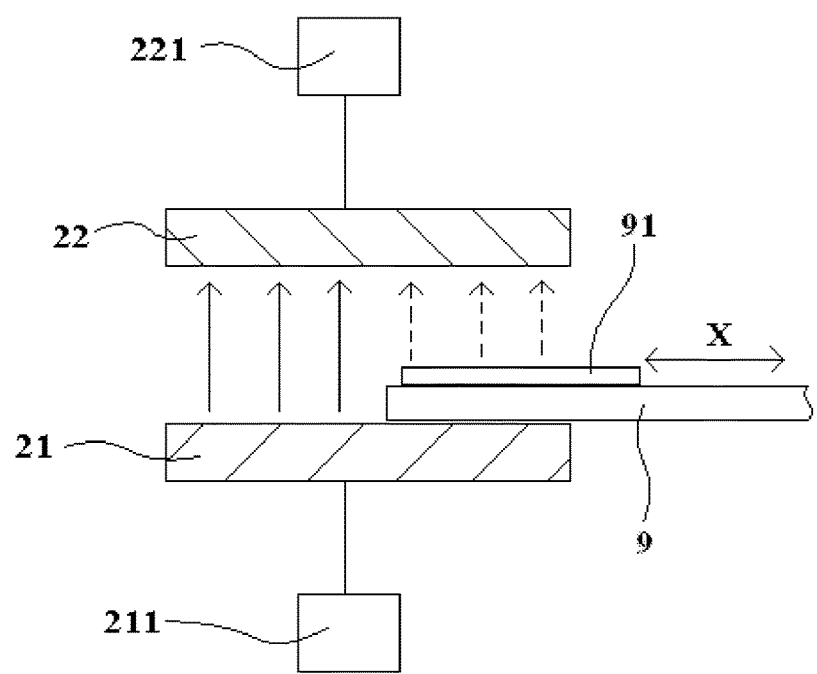
FIG. 3 is a schematic side view of a detection device when performing detection of some embodiments of the present disclosure.
Figure 4:
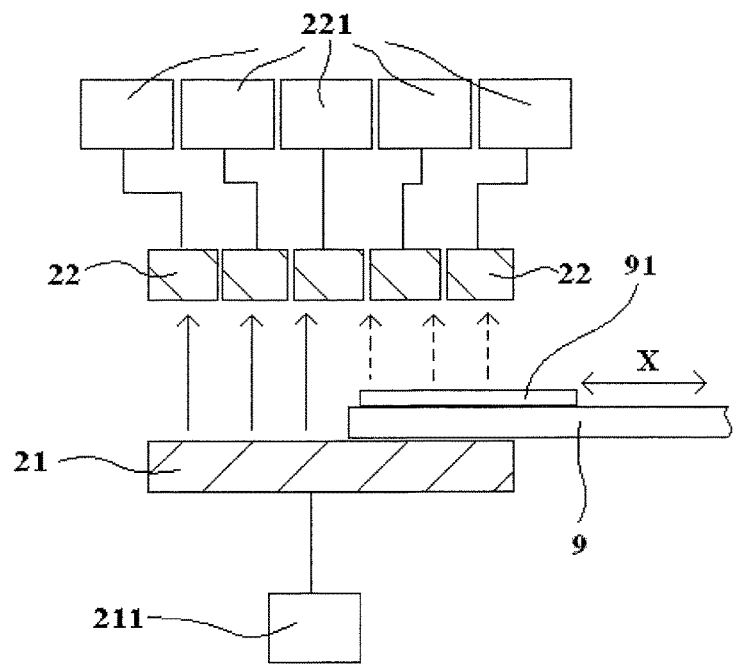
FIG. 4 is a schematic side view of another detection device when performing detection of some embodiments of the present disclosure.

As shown in FIGS. 2 to 4, the detection device 2 includes an emitting electrode 21 and a receiving electrode 22 disposed to be opposite to each other, which are disposed at an edge of the carrying position 11 of the substrate holder 1 (i.e., an edge of the substrate 9) and located at upper and lower sides of the substrate 9, respectively (i.e., the substrate 9 is sandwiched between the emitting electrode 21 and the receiving electrode 22).

As shown in FIG. 2, the emitting electrode 21 is disposed at the upper side of a carrying position 11, and the receiving electrode 22 is disposed at the lower side of a carrying position 11, which is described as an example, while the present disclosure is not limited thereto. For example, the positions of the emitting electrode 21 and the receiving electrode 22 are interchangeable. For another example, a special structure can also be provided for carrying the emitting electrode 21, the receiving electrode 22, and so on. But it is possible, as long as the emitting electrode 21 and the receiving electrode 22 are located at the edge of the carrying position 11 and disposed to be opposite to each other at the upper and lower sides of the substrate 9.

Obviously, the above two opposite emitting electrode 21 and receiving electrode 22 constitute a capacitor, and thus when the emitting electrode 21 carries a signal (which is from a signal source), an induction signal is generated in the receiving electrode 22. The induction signal is related to the capacitance value of the capacitor. Since the capacitance value C of a plate capacitor is proportional to $\varepsilon * S/d$, and in this case, the area S in which the electrodes are facing and the distance d between the electrodes are unchanged, the capacitance value thereof is determined by the dielectric constant $\varepsilon$. The dielectric constant of the substrate 9 (including the structure of the film and the like) is, of course, different from that of the air, such that when the substrate 9 is located at a different position between the two electrodes, which is equivalent to adding a different dielectric (dielectric material), the dielectric constant varies, that is, the capacitance value varies, resulting in a different induction signal. Therefore, the position of the substrate 9 between the two electrodes, i.e. the position of the substrate 9 on the substrate holder 1, can be determined by analyzing the induction signal.

Since the above detection is performed automatically by the device, so that its efficiency is high, the error is small, the error rate is low, and the detection can be performed at any time.

Optionally, the signal source 211 is a high frequency signal source, and the detector 221 is a current detector.

That is, the emitting electrode 21 is optionally connected to the high frequency signal source (optionally having a frequency of 600 KHz and 800 KHz), and the receiving electrode 22 is connected to the current detector. This is because the capacitor is turned on by the high frequency signal, and with respect to a constant voltage signal (the induction signal has a constant voltage), the induction signal is an alternating current, and such induction signal facilitates accurate detection.

Optionally, there are more receiving electrodes 22, and the receiving electrodes 22 are connected to different detectors 221, respectively.

As shown in FIG. 3, when there is one receiving electrode 22, the movement of the substrate 9 corresponds to a change of the dielectric constant of the partial position of the capacitor, which may cause a change in the induction signal. However, when the movement of the substrate 9 has a very small range, which only corresponds to a slight change in the area of the substrate 9 between the electrodes, the change in the induction signal caused is very small, and the detection result is not sensitive enough.

As shown in FIG. 4, when there are a plurality of receiving electrodes 22, it is equivalent to that a plurality of capacitors, which are independent of each other, are constituted, and the capacitors can generate independent induction results. When the movement of the substrate 9 has a very small range, the capacitor near the edge of the substrate 9 changes from a state of having no substrate 9 in the middle to a state of having the substrate 9 in the middle (or vice versa), thus the induction signal changes greatly. In other words, if the induction signals of two adjacent receiving electrodes 22 have a large difference (assuming that the receiving electrodes 22 have the same structure), this demonstrates that the edge of the substrate 9 is between the two receiving electrodes 22, such that it can more accurately determine the position of the substrate 9.

Figure 5:
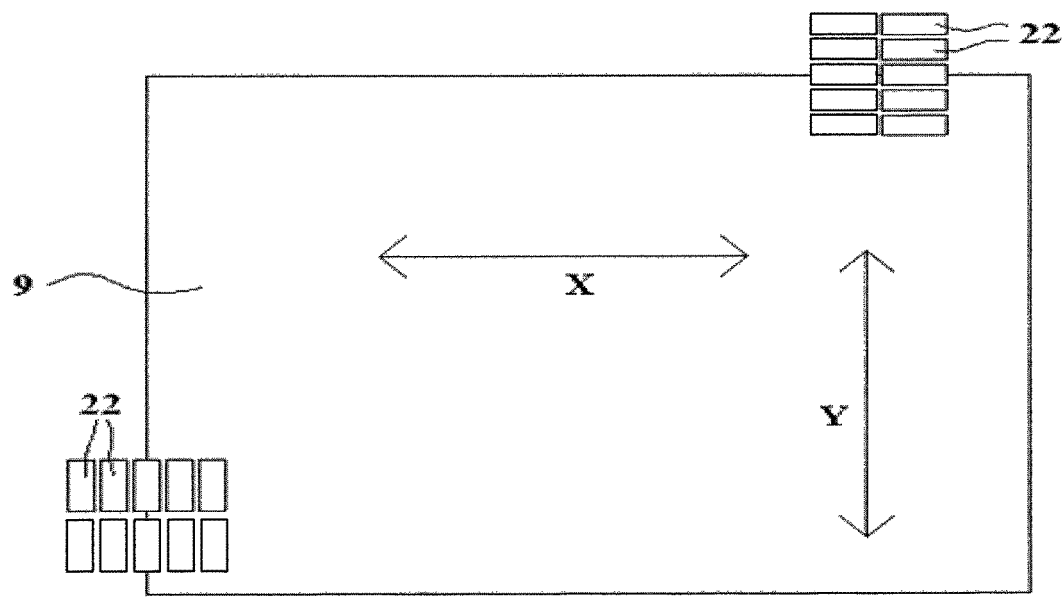
FIG. 5 is a schematic top view of the relationship between the receiving electrode and the substrate in a detection device of some embodiments of the present disclosure.
Figure 6:
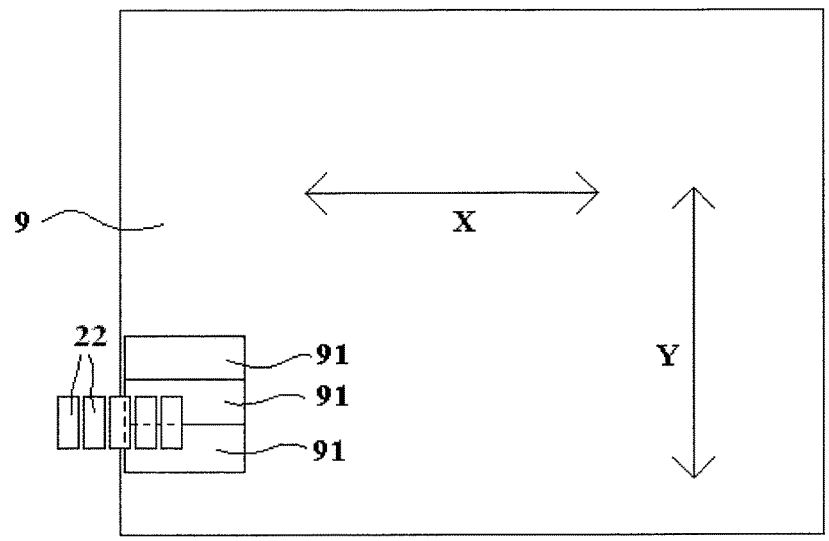
FIG. 6 is a schematic top view of the relationship between the receiving electrode and the substrate in another detection device of some embodiments of the present disclosure.

More optionally, the plurality of receiving electrodes 22 are arranged in a direction perpendicular to the edge of the carrying position 11 where the detection device 2 is located. As shown in FIGS. 4 to 6, when one detection device 2 has a plurality of receiving electrodes 22, these receiving electrodes 22 may be optionally arranged in a straight line, and perpendicular to the edge of the substrate 9 where the receiving electrodes 22 are located. The plurality of receiving electrodes 22 can most simply detect the position of the substrate 9 in a direction perpendicular to its edge.

An embodiment of the present disclosure further provides a substrate holder 1, which including: a plurality of carrying positions 11, each of which is used to carry a substrate 9; and the detection device 2 described as above.

That is, in the substrate holder 1 of the embodiment of the present disclosure, at least some of the carrying positions 11 are provided therein with the detection device 2 described as above (which is, of course, located at the edge of the carrying position 11, and two electrodes are at the upper and lower sides of the substrate 9, respectively), such that the position of the substrate 9 carried thereon may be accurately detected.

Optionally, as one manner of the embodiments of the present disclosure, each carrying position 11 is provided with two detection devices 2, wherein one detection device 2 is disposed at a first edge of the carrying position 11, and the other detection device 2 is disposed at a second edge of the carrying position 11. The first edge is perpendicular to the second edge.

That is, as shown in FIG. 5, a detection device 2 may be disposed at each of two edges of the carrying position 11 which are perpendicular to each other, such that they are used to detect the position of the substrate 9 in both directions (in a X direction and a Y direction as an example, and the X-Y plane is the plane of the carrying position 11).

Optionally, as another manner of the embodiments of the present disclosure, each carrying position 11 may also be provided with one detection device 2, and the detection device 2 is disposed at a first edge of the carrying position 11.

That is, as shown in FIG. 6, each carrying position 11 may also be provided with one detection device 2, such that the position of the substrate 9 in one direction (for example, an error may not be substantially generated in the other direction) is detected. Or, one detection device 2 can also be used to detect the position of the substrate 9 in both directions (see below the specific manner), thereby reducing the number and cost of the detection device 2.

An embodiment of the present disclosure further provides a method for detecting a position of the substrate 9 on the substrate holder 1 described as above. The method includes: transmitting a signal by an emitting electrode 21 of a detection device 2; receiving the signal and generating an induction signal by a receiving electrode 22; and determining the position of the substrate 9 by analyzing the induction signal.

That is, the emitting electrode 21 transmits a signal, and an induction signal is generated in the receiving electrode 22. The position of the substrate 9 is obtained by analyzing the induction signal. The specific relationship between the induction signal and the position of the substrate 9 is related to the form of the detection device 2 and the like, and the correspondence between the induction signal and the position of the substrate 9 can be calculated by the basic physical formula according to the principle of the change in the capacitance described as above, thus this will not be described in detail.

Optionally, referring to FIG. 6, if each of the above carrying positions 11 of the substrate holder 1 is provided with one detection device 2, the substrate 9 carried by the carrying position 11 is provided with at least two adjacent auxiliary dielectric layers 91 arranged in a direction parallel to a first edge thereof at the first edge close to the carrying position 11. Values of dielectric constants of the auxiliary dielectric layers 91 divided by thicknesses thereof are different from each other. The detection device 2 is disposed at a position of the auxiliary dielectric layer 91 of the substrate 9, and in a direction parallel to the first edge. A size of the receiving electrode 22 is greater than or equal to a size of each auxiliary dielectric layer 91, and is smaller than or equal to the total size of all of the auxiliary dielectric layers 91.

As described as above, with the above arrangement, the substrate holder 1, in which each carrying position 11 described as above is provided with one detection device 2, can also simultaneously detect the position of the substrate 9 in both directions. In particular, as shown in FIGS. 4 and 6, when the substrate 9 moves in a direction (here referred to as a X direction) perpendicular to the first edge of the substrate 9, the area of the substrate 9 sandwiched between the receiving electrode 22 and the emitting electrode 21 changes (or correspondence between some receiving electrodes 22 and the substrate 9 changes). Thus, as shown in FIG. 7, the corresponding induction signal also changes, and a transition point of the induction signal moves in the X direction, such that the position of the substrate 9 in the X direction can be determined by the a transition position of the induction signal.

As shown in FIG. 6, in a direction (here referred to as a Y direction) of a second edge of the substrate 9 perpendicular to the first edge, a plurality of auxiliary dielectric layers 91 (for example, silicon nitride layer, silicon oxide layer or the like) are disposed at the first edge of substrate 9. Those auxiliary dielectric layers 91 may be specifically prepared, or may be left in the preparation of other existing structures in the substrate 9. Further, those auxiliary dielectric layers 91 are different in material and/or thickness, such that values of dielectric constants thereof divided by the thicknesses are different from each other, i.e., $\varepsilon/d$ is different. Thus, when the auxiliary dielectric layer 91 of the substrate 9 sandwiched between the receiving electrode 22 and the emitting electrode 21 is changed, the capacitance of the capacitor is correspondingly changed. Further, since the receiving electrode 22 satisfies a specific size in the Y direction, once the substrate 9 moves in the Y direction, the type of each of the auxiliary dielectric layers 91 of the substrate 9 sandwiched between the receiving electrode 22 and the emitting electrode 21 corresponding to the substrate 9 is necessarily changed. Thus, as shown in FIG. 7, the induction signal of the receiving electrode 22 corresponding to the substrate 9 becomes larger or smaller as a whole, such that the position of the substrate 9 in the Y direction can be determined by the degree of change of the induction signal.

Figure 7:
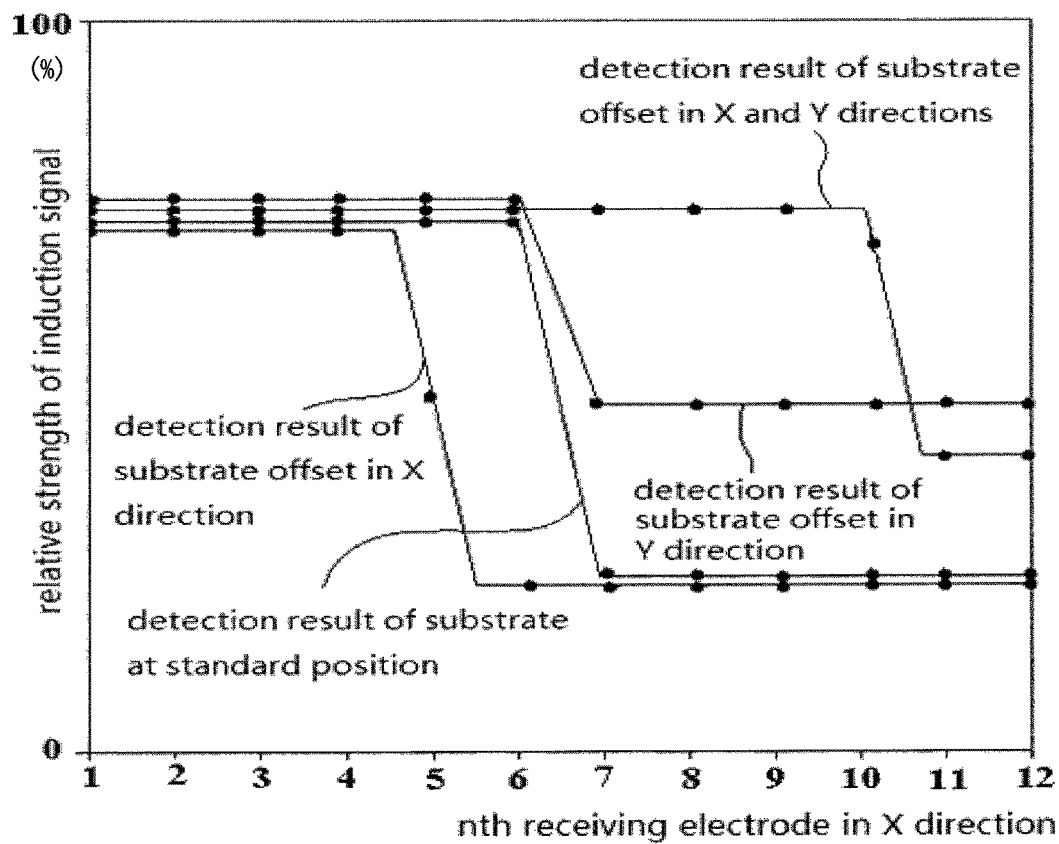
FIG. 7 is a diagram of the result of detection performed by the detection device of FIG. 6.

It is to be understood that in FIG. 7, the horizontal lines of each of the detection results are actually overlapped with each other, but in order to clearly distinguish the different detection results, it is shown separately in the figure.

Thus, an embodiment of the present disclosure further provides a substrate 9, and at least two auxiliary dielectric layers 91 arranged in a direction parallel to a first edge of the substrate 9 are disposed at the first edge. Values of dielectric constants of the auxiliary dielectric layers 91 divided by thicknesses thereof are different from each other.

Of course, the present disclosure is not limited to the detection device 2, the substrate holder 1, and the method for detecting the position of the substrate 9 on the substrate holder 1 and so on described as above, and many variations can be made by those skilled in the art. As an example, each detection device 2 in above FIGS. 5 to 7 includes a plurality of receiving electrodes 22, but it is also possible if each detection device 2 has one receiving electrode 22. As another example, a plurality of receiving electrode 22 of one detection device 2 may also constitute a "matrix", and the detection device 2 is disposed at a corner of the carrying position 11. The edge line of the corner of the substrate 9, that is, the location of the substrate 9, can be determined by determining which receiving electrodes 22 correspond to the substrate 9 and which receiving electrodes 22 do not correspond to the substrate 9.

It is to be understood that the above embodiments are merely exemplary embodiments for the purpose of illustrating the principles of the present disclosure, however, the present disclosure is not limited thereto. It will be apparent to those skilled in the art that various changes and modifications can be made therein without departing from the spirit and essence of the present disclosure, which are also to be regarded as the scope of the present disclosure.

What is claimed is:

1. A detection device for detecting position of a substrate carried on a substrate holder, the detection device comprising:
   an emitting electrode connected to a signal source, wherein the substrate holder comprises a plurality of carrying positions used to carry the substrate, and wherein the emitting electrode is disposed at an edge of one of the plurality of carrying positions and at a first side of an upper or a lower side of the substrate; and
   at least one receiving electrode connected to a detector, wherein the receiving electrode is disposed opposite the emitting electrode and at a second side of the upper or lower side of the substrate different from the first side,
   wherein each of the carrying positions is provided with the detection device, and the detection device is disposed at a first edge of the carrying position,
   wherein the substrate carried by the carrying position comprises at least two auxiliary dielectric layers disposed at the first edge of the substrate close to the carrying position and arranged in a direction parallel to the first edge, and values of dielectric constants of the auxiliary dielectric layers divided by thicknesses of the auxiliary dielectric layers, respectively, are different from each other, and
   wherein, the receiving electrode of the detection device is disposed at a position of the carrying position corresponding to a position of the auxiliary dielectric layer of the substrate, and in a direction parallel to the first edge, and a size of the receiving electrode is greater than or equal to a size of each of the auxiliary dielectric layers, and smaller than or equal to the total size of all of the auxiliary dielectric layers.

2. The detection device of claim 1, wherein the signal source is a high frequency signal source, and the detector is a current detector.

3. The detection device of claim 2, wherein a signal frequency generated by the high frequency signal source is between 600 KHz and 800 KHz.

4. The detection device of claim 3, wherein the detection device comprises a plurality of receiving electrodes respectively connected to different detectors.

5. The detection device of claim 2, wherein the detection device comprises a plurality of receiving electrodes respectively connected to different detectors.

6. The detection device of claim 1, wherein the detection device comprises a plurality of receiving electrodes respectively connected to different detectors.

7. The detection device of claim 6, wherein the plurality of receiving electrodes are arranged in a direction perpendicular to an edge of the carrying position where the detection device is located.

8. The detection device of claim 7, wherein the plurality of receiving electrodes are arranged in a straight line.

9. The detection device of claim 7, wherein the plurality of receiving electrodes constitute a matrix.

10. A substrate holder, comprising:
    a plurality of carrying positions used to carry a substrate; and
    a detection device for detecting position of a substrate carried on the substrate holder, wherein the detection device comprises:
    an emitting electrode connected to a signal source, wherein the substrate holder comprises a plurality of carrying positions used to carry the substrate, and wherein the emitting electrode is disposed at an edge of one of the plurality of carrying positions and at a first side of an upper or a lower side of the substrate; and
    at least one receiving electrode connected to a detector, wherein the receiving electrode is disposed opposite the emitting electrode and at a second side of the upper or lower side of the substrate different from the first side,
    wherein each of the carrying positions is provided with the detection device, and the detection device is disposed at a first edge of the carrying position,
    wherein the substrate carried by the carrying position comprises at least two auxiliary dielectric layers disposed at the first edge of the substrate close to the carrying position and arranged in a direction parallel to the first edge, and values of dielectric constants of the auxiliary dielectric layers divided by thicknesses of the auxiliary dielectric layers, respectively, are different from each other, and
    wherein, the receiving electrode of the detection device is disposed at a position of the carrying position corresponding to a position of the auxiliary dielectric layer of the substrate, and in a direction parallel to the first edge, and a size of the receiving electrode is greater than or equal to a size of each of the auxiliary dielectric layers, and smaller than or equal to the total size of all of the auxiliary dielectric layers.

11. The substrate holder of claim 10, wherein each of the carrying positions is provided with two detection devices, one of the detection devices is disposed at a first edge of the carrying position, and the other of the detection devices is disposed at a second edge of the carrying position, and the first edge is perpendicular to the second edge.

12. The substrate holder of claim 10, wherein the detection device comprises a plurality of receiving electrodes which constitute a matrix.

13. The substrate holder of claim 12, wherein,
    each of the carrying positions is provided with the detection device, and the detection device is disposed at a corner of the carrying position.

14. The substrate holder of claim 10,
    wherein the signal source is a high frequency signal source, and the detector is a current detector.

15. The substrate holder of claim 14,
    wherein a signal frequency generated by the high frequency signal source is between 600 KHz and 800 KHz.

16. The substrate holder of claim 10,
    wherein the detection device comprises a plurality of receiving electrodes respectively connected to different detectors.

17. The substrate holder of claim 10,
    wherein a plurality of receiving electrodes are arranged in a direction perpendicular to an edge of the carrying position where the detection device is located.

* * * * *